United States Patent
Palm et al.

(10) Patent No.: US 8,321,564 B2
(45) Date of Patent: Nov. 27, 2012

(54) RENDERING DEVICE SELECTION IN A HOME NETWORK

(75) Inventors: Stephen Ray Palm, Irvine, CA (US); Jeyhan Karaoguz, Irvine, CA (US); Xuemin Chen, Rancho Santa Fe, CA (US)

(73) Assignee: Broadcom Corporation, Irvine, CA (US)

( * ) Notice: Subject to any disclaimer, the term of this patent is extended or adjusted under 35 U.S.C. 154(b) by 262 days.

(21) Appl. No.: 12/343,634

(22) Filed: Dec. 24, 2008

(65) Prior Publication Data

US 2010/0161822 A1  Jun. 24, 2010

(51) Int. Cl.
*G06F 15/173* (2006.01)
(52) U.S. Cl. ............................ 709/225; 725/80; 348/734
(58) Field of Classification Search .................. 709/225; 725/80; 348/734
See application file for complete search history.

(56) References Cited

U.S. PATENT DOCUMENTS

| | | | |
|---|---|---|---|
| 7,064,675 B2 * | 6/2006 | Zigmond et al. | 340/825.72 |
| 7,561,215 B2 * | 7/2009 | Kim et al. | 348/734 |
| 2005/0055716 A1 * | 3/2005 | Louie et al. | 725/58 |
| 2006/0048194 A1 * | 3/2006 | Poslinski | 725/81 |
| 2007/0136778 A1 * | 6/2007 | Birger et al. | 725/117 |
| 2007/0260697 A1 * | 11/2007 | Shapiro | 709/212 |
| 2009/0187957 A1 * | 7/2009 | Avkarogullari | 725/109 |
| 2009/0327521 A1 * | 12/2009 | Huotari et al. | 709/240 |
| 2010/0057882 A1 * | 3/2010 | Haartsen et al. | 709/218 |

* cited by examiner

*Primary Examiner* — Thomas Dailey
(74) *Attorney, Agent, or Firm* — Garlick & Markison (57) ABSTRACT

A technique to remotely identify a source of a transaction for transferring content on a home network and to identify a plurality of renderers for rendering the content when transferred. Where multiple pathways are present to transfer the content, remote identification of one or more pathways are also determined to transfer the content. Then, a rendering parameter is determined for each renderer for rendering the content and based on one or more criteria, a renderer is selected for rendering the content, along with the pathway for delivering the content.

20 Claims, 8 Drawing Sheets

RENDERING DEVICE SELECTION IN A HOME NETWORK

BACKGROUND OF THE INVENTION

1. Technical Field of the Invention

The present invention relates generally to communication systems and, more particularly, to delivery of multimedia content across different platforms that are made interoperable through a network, such as a home network.

2. Description of Related Art

Content connectivity in a residence or office environment is becoming more attractive to simplify the way information is controlled and delivered. As more residences are built to accommodate a digital environment (digital home), the prior practice of having many different systems that operate independently from one another is undesirable for a number of reasons. In a typical home, a variety of electrical devices are present, but most of these devices operate independently from one another. For example, a television system that typically includes one or more displays, a digital video recorder (DVR) and/or a digital video disc (DVD) recorder/player, and which may also include a converter (generally known as a set-top box) may form one system. A television system in a home is typically connected together by a coaxial cable which runs through the home. Another system which may be present in a home is a telephone system, in which one or more telephone units are distributed throughout the house. A home telephone system may be wired or wireless or a combination of the two. Still another system typically found in a home is a computer system, in which one or more computers are connected to various peripherals, such as printers, cameras, compact disk (CD) or DVD players, mass storage units, routers, etc. Typically, various components of a home computer system are tied together by a router and/or a server through a wired local area network (LAN), a wireless LAN (WLAN) or a combination of both wired and wireless local area network, as well as other connectivity. Further, the home computer network is coupled to external networks, such as the Internet, through cable modem connections, DSL (Digital Subscriber Line) modem connections, telephone connections and/or microwave (e.g. satellite) connections, as well as other connections.

In an existing home, many of these systems operate independently from one another and complications are well noted in trying to bridge content from one system to another. For example, a digital photo may be readily transferred to a computer from a camera, so that a photo may be printed from a printer connected to the computer, but it is typically not possible to transfer the photo for display onto a television set. Likewise, a movie that may be played from a DVD player of a notebook computer may be watched on the notebook display, but that same movie cannot be watched on a television set in the home, unless the DVD is transferred to a DVD player connected to the television set or the notebook video output is connect to the television set.

More recently, a concept for an integrated digital home has emerged in order to tie together the various digital systems in a home. By developing an interoperable network to integrate both wired and wireless platforms, content may be delivered across these different platforms and shared seamlessly by devices coupled to the interoperable network. For example, personal computers (PCs), consumer electronics (CEs) and mobile devices, such as cellular telephones (cell phones), personal digital assistants (PDAs) and mobile multimedia devices (e.g. portable MP-3 players) may transfer content among themselves with minimal or no effort from the person wanting the content.

One entity which is attempting to form a cross-industry convergence of platforms is the Digital Living Network Alliance (DLNA). The various platforms, such as set-top boxes (STBs), PCs, DVD players, gaming machines, MP-3 players, Blue Ray™ players, mobile phones, personal media players, as well as others, may be integrated using one or more connectivity, such as multimedia over cable (MoCA) wired connection, Wi-Fi wireless connection, Ethernet wired LAN connection, Bluetooth wireless connection, Blue-Fi wireless connection, optical connectivity and powerline connectivity, as well as others. Once these various systems are tied together for seamless content sharing in a home network, content obtained from one platform may be transferred seamlessly to another platform using some form of connectivity.

Once the interoperable system is available in a home, the content to and/or from the various platforms may be manipulated in a variety of ways. This is possible, since a previously passive device, such as a television set, is now coupled to a processing device, such as a PC or a cell phone, so that additional computational power is now available to control content delivery to the passive device, or to other devices. Thus, new techniques to exploit this interoperability across platforms may be implemented to further control or enhance content delivery.

SUMMARY OF THE INVENTION

The present invention is directed to apparatus and methods of operation that are further described in the following Brief Description of the Drawings, the Detailed Description of the Embodiments of the Invention, and the Claims. Other features and advantages of the present invention will become apparent from the following detailed description of the embodiments of the invention made with reference to the accompanying drawings.

DETAILED DESCRIPTION OF THE EMBODIMENTS OF THE INVENTION

The embodiments of the present invention may be practiced in a variety of settings that utilize an integrated home network. The term "home network" is used herein for explanatory purpose only in order to simplify the description below. The invention is applicable to a variety of multimedia networks and the multimedia network need not be limited to a residence-based network. The described home-based network or "home network" may be implemented as a multimedia network in other types of buildings, both commercial and non-commercial, as well as across several sites that may not be contiguously connected.

Figure 1:
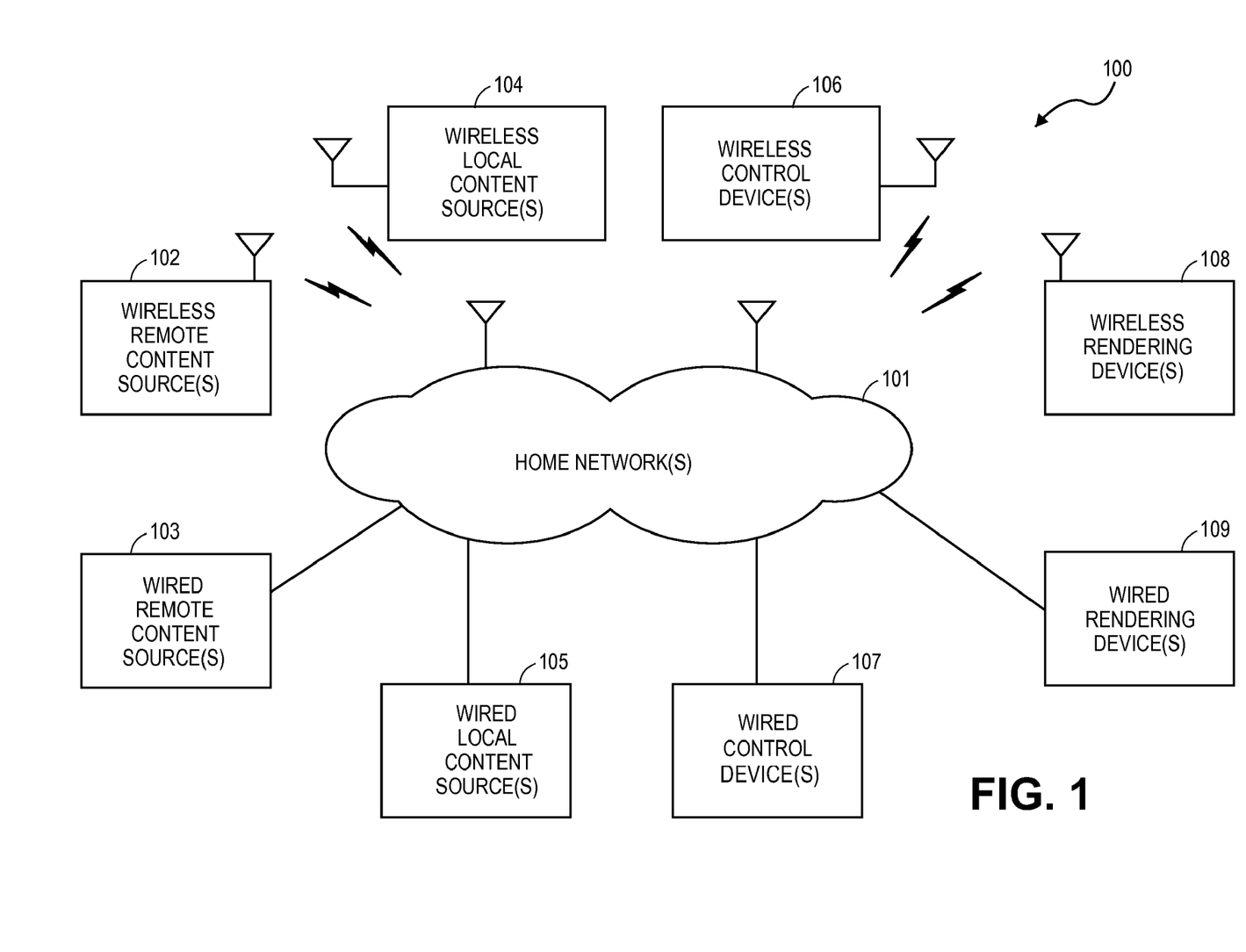
FIG. 1 is a block diagram showing an exemplary home network system for implementing an embodiment of the invention.

FIG. 1 shows a system 100 in which a variety of devices are coupled to a home network 101. Home network 101 may comprise one network or multiple networks, but for simplicity only the singular is used in the description of FIG. 1. Furthermore, as noted above, home network 101 may be any type of network that transports ordinary data, multimedia data or other information and need not be confined to a residence (e.g. home). The transfer of data may be serial, parallel, packet, non-packet, streaming, etc. The format may vary depending on the particular network or system. Home network 101 may be a wired network, wireless network or a combination of the two.

As shown in FIG. 1, a variety of wired and/or wireless devices are coupled to home network 101. FIG. 1 exemplifies the various devices that may couple to home network 101 and it is to be noted that some systems may have less devices coupled to the home network 101 than shown or more devices than shown. In the particular example, home network 101 may couple to one or more remote content source(s). The remote content source is usually located external to the "home" and is accessed by home network 101 through some communication pathway that connects to the remote content provider. In the shown example, home network 101 couples to one or more wireless remote content source(s) 102 through a wireless communication pathway, while home network 101 couples to one or more wired remote content source(s) 103 through a wired communication pathway.

As an example, one wireless remote content source may be a content provider of satellite programs where movies and television programming may be transmitted to home network 101 through satellite communication channels. A cellular telephone channel is another example in which content is provided to home network 101 by wireless means. An example of a wired connection to a wired remote content source is a cable link from home network 101 to a television programming provider, which may also provide movies for viewing. A wired Internet connection is another example, in which the wired connection of home network 101 to the Internet allows various content to be delivered from one or more remote source(s) to home network 101. Telephone land lines are another example of a wired connection that may be used. These are just some of the examples of remote content sources and the invention is not limited to the described examples.

Home network 101 may also couple to one or more wireless local content source(s) 104 and/or one or more wired local content source(s) 105. The local content sources 104, 105 may provide a variety of content and some of the content may be the same or similar to the content provided from remote content sources 102, 103. The difference is that the local content is sourced proximal to home network 101, so that external connection is not generally required to access the local content. An example of wired local content source 105 is a hard disk drive or a DVD/CD player of a personal computer (PC) or a server that couples to home network 101 by a LAN connection, such as an Ethernet connection. Another example of a wired local content source is a DVR device or a DVD player that couples to a television through home network 101. An example of wireless local content source 104 is a portable notebook computer that couples to home network 101 by wireless means, such as Wi-Fi, or Bluetooth™, or Blue-Fi. Another example of a wireless local content source is a cell phone or portable multimedia player that stores content (such as music) and has the capability to communicate with home network 101 to transfer content to home network 101. Again, these are examples only and should not be read to limit the invention. A variety of other local content sources, both wired and wireless, may be implemented for use with home network 101.

The content that is being transported on home network 101 from one or more of the sources 102-105 has a destination to which the content is rendered. Content is rendered when the content is made available to a renderer, which typically is a device that uses or operates on the delivered content. In the example of FIG. 1, home network 101 may be coupled to one or more wireless rendering device(s) 108 and/or wired rendering device(s) 109. Examples of wired rendering devices include television displays, computer displays, audio speakers and headphones, wired printers, etc. Examples of wireless rendering devices include wirelessly connected printers, speakers, headsets, handheld displays, etc. These are just some examples of wired and wireless rendering devices and the invention is not limited to just these devices.

Also shown coupled to home network 101 are one or more wireless control device(s) 106 and or one or more wired controlled device(s) 107. It is to be noted that some processing intelligence is coupled to home network 101 to ensure proper operation of home network 101 in content delivery. In the example system 100, a wireless control device or a wired control device, or a combination of both, may provide operational control of portions or devices on home network 101. In some instances, one control device may provide full control of all content transport within home network 101 or the responsibility for content transfer may be divided among multiple units. Examples of control devices for either wireless control device(s) 106 or wired control device(s) 107 include, PCs, notebook computers, server computers, set-top boxes, handheld remotes and cell phones. These are just some examples and it is noted that other devices may be used as control devices as well.

System 100 is an illustrated example of a home network system in which contents are sourced, either locally or remotely, to one or more rendering devices. The various devices may communicate by wired or wireless means with home network 101. One or more control devices may be present to control home network 101 or control the transfer of the content from the content source to the rendering device (which is also referred to as a renderer herein). In some instances, a control device (such as control device 105, 106) may be part of (e.g. built into) the content source or the renderer. For example, when the content is stored in a computer, such as a PC, the PC may also serve as the control device. Likewise, if a set-top circuitry is built into a television set, then the television set may both be the renderer and the control device. Thus, system 100 is shown as an example only and other systems may be used to practice the invention.

Figure 2:
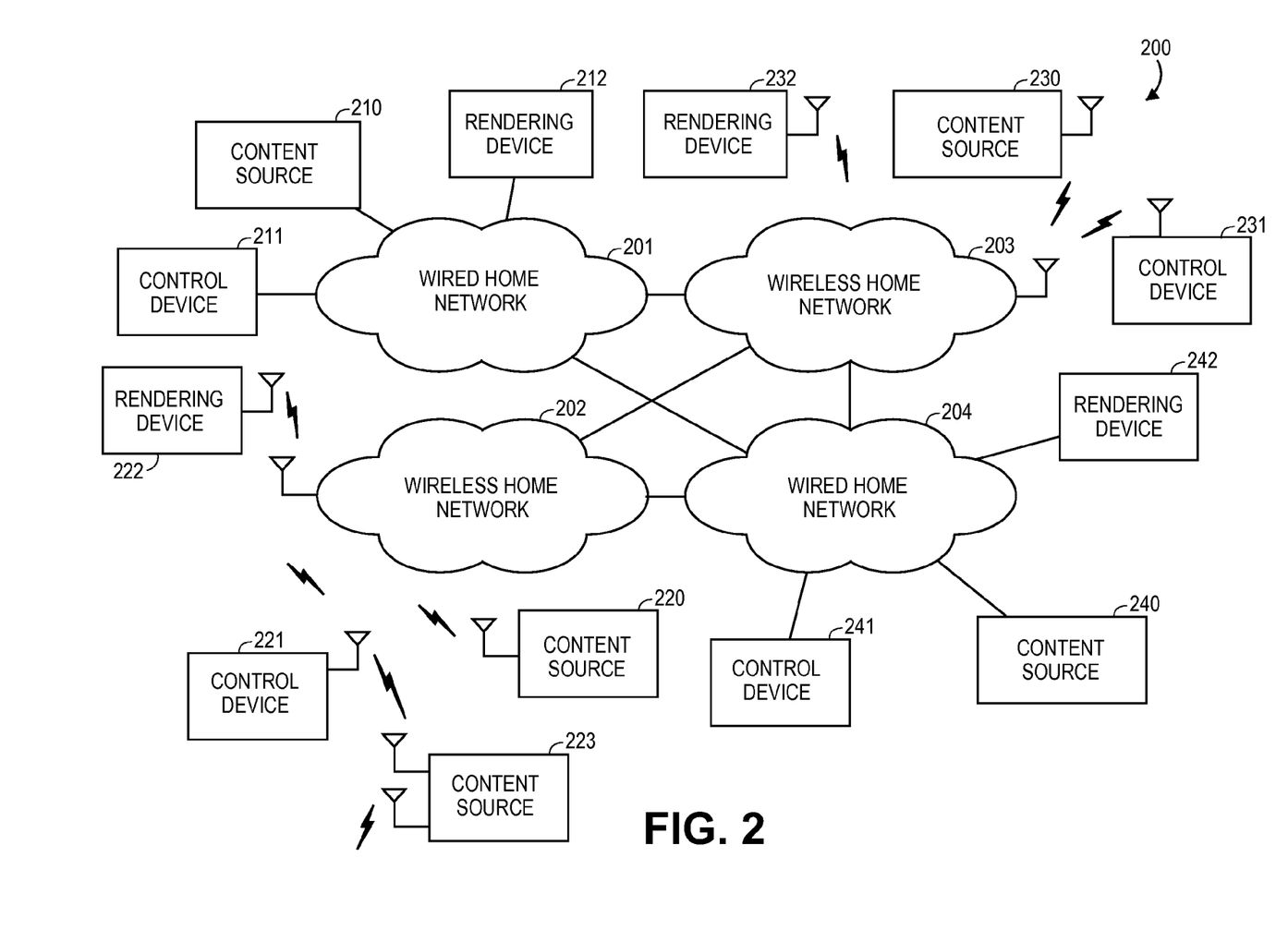
FIG. 2 is a block diagram showing another exemplary home network system having multiple networks for implementing an embodiment of the invention.

FIG. 2 is another example of a home network system 200 in which multiple home networks are present within a premise. Two home networks 201, 204 are wired while two home networks 202, 203 are wireless. The actual number and type (wired or wireless) of networks may vary from system to system. The four home networks 201-204 are inter-coupled so that in some embodiments, content may be transferred across networks. Content source 210, control device 211 and rendering device 212 are coupled to wired home network 201 by wired means. Likewise, content source 240, control device 241 and rendering device 242 are coupled to wired home network 204 by wired means. Content source 220, control device 221 and rendering device 222 are coupled to wireless home network 202 by wireless means. Likewise, content source 230, control device 231 and rendering device 232 are coupled to wireless home network 203 by wireless means. An additional content source 223 is shown also coupled to home network 202. As noted with system 100 of FIG. 1, some embodiments may not have all of the noted devices, while others may have more devices. What is to be noted is that various wired and/or wireless content source, rendering and control devices are coupled to a multi-network system.

The various devices that are coupled to the networks 201-204 operate equivalent to the respective devices noted for system 100 in FIG. 1. Thus, each content source 210, 220, 223, 230, 240 represents a remote content source, local content source, or both local and remote (as noted in FIG. 1). Content source 223 is shown having multiple antennas to indicate that multiple-input, multiple-output (MIMO) communication protocol may be used as well for wireless communications. The wired and/or wireless networks may be of the same platform or may be of different platforms. For example, in one embodiment, wired home network 201 may be a wired local area network (LAN), such as an Ethernet network, that allows computers to be coupled to various peripheral device; wireless home network 202 may be a Wi-Fi network within a premise, such as Wi-Fi that implements 802.11 a/b/g protocol or the 802.11n MIMO protocol; wireless home network 203 may be a Bluetooth™ or Blue-Fi network; and wired home network 204 may be a wired telephone network, a coaxial cable network (such as the aforementioned MoCA), optical network or a powerline network (such as the HomeGrid connectivity) that distributes audio, video and/or multimedia signals. In these instances, devices of corresponding platforms are coupled to a respective home network 201-204. Again, other embodiments may have different networks and connectivity. What is to be noted is that devices of different platforms may be coupled to corresponding networks and the networks are interoperably coupled together to operate as a home system. It is to be noted that some devices may have the capability to operate within more than one network. For example, a laptop or notebook computer may be coupled to various corresponding network by a wired LAN or coaxial connection, as well as having Wi-FI capability to connect wirelessly. The notebook computer may also have Bluetooth capability as well.

Figure 3:
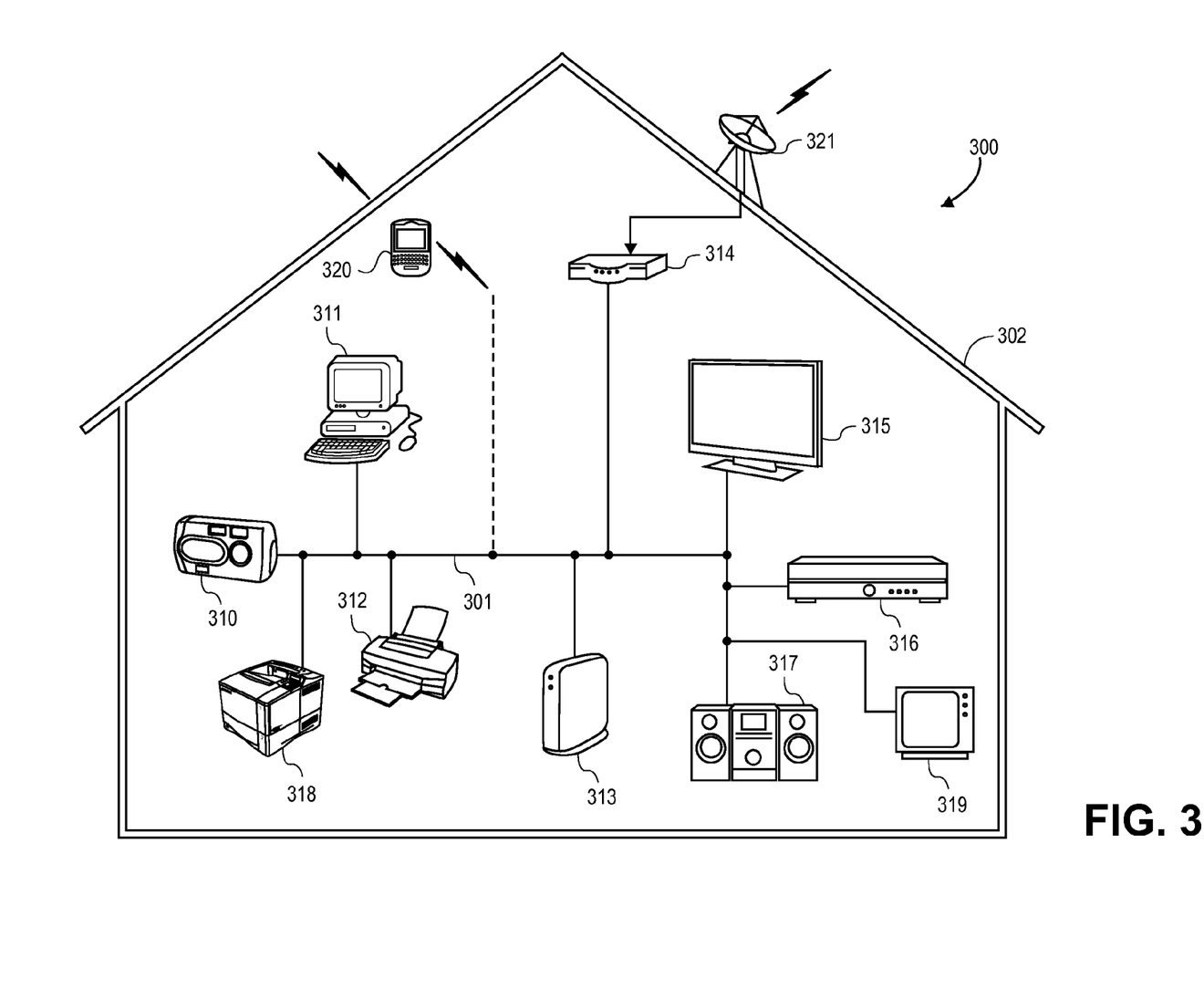
FIG. 3 is a pictorial example illustration showing various home devices that are coupled together in a home network.

FIG. 3 shows an example of a home system 300 having a home network 301 within a premise 302, such as a home. Although a single communication path is shown for network 301, it is to be noted that the above-described examples of home network 101 or multiple home networks 201-204, as well as other embodiments using wired and/or wireless connectivity, may be employed for home network 301. Various devices 310-319 are also shown coupled to home network 301. Devices 310-319 exemplify different types of content source, control and rendering devices that may be found in a home environment. Although a line is shown coupling devices 310-319 to home network 301, it is understood that devices 310-319 represent devices that may operate wired, wireless or both, in accordance with the description of devices of FIGS. 1 and 2. Furthermore, devices 310-319 may operate within the same platform or may operate in different platforms, but made inter-operable by the home network or networks.

In the particular example of system 300, device 310 is a digital camera, device 311 is a desktop PC (or alternatively a notebook computer), device 312 is a printer, device 313 is a network storage medium, device 314 is a modem (or alternatively a set-top box), device 315 is a television display, device 316 is a DVR or DVD recorder/player, device 317 is an audio recorder/player, device 318 is another printer and device 319 is another video display or television. These particular devices are presented here as an example only and, in other embodiments, different devices may be coupled to home network 301. As noted, modem 314 couples to a satellite dish 321 to reach a remote content source through satellite communication channels. Modem 314 could be a cable modem which communicates with a remote content source (such as a cable provider). Internet connection through modem 314 also allows system 300 to communicate with a remote content source through the Internet.

As noted above, some of the devices of system 300 may operate strictly in one capacity as a content source, control unit or renderer, while other devices may have multiple roles. For example, PC 311 may operate as a source when providing a PC stored content. It may also operate as a renderer when displaying photographs sent from camera 310, in which case camera 310 would be the source of the content. PC 311 may also operate as a control device in controlling the transfer of content from camera 310 to printer 312 for printing a photograph. In this instance, printer 312 would be the renderer. Again, in some embodiments, the control function may reside in the source or in the renderer, so that a separate control unit may not be needed.

FIG. 3 also shows a wireless device 320, such as a mobile telephone (e.g. a cellular telephone) or digital media device (or alternatively a remote control unit) that couples to home network 301. As a mobile telephone or digital media device, wireless device 320 may connect to a remote content source or as a remote control unit, may control the transfer of content from a source device to a rendering device. Device 320 may perform both functions as well. As described below, wireless device 320 may operate as a remote control device to deliver content to a selected rendering device.

In the particular example, the content that resides on the various devices or is loaded onto a device (such as by insertion of DVD or CD disks) are regarded as local content, since the content resides within premise 302. Content obtained remotely from sources external to premise 302 through pathways, such as satellite, microwave, cable or publicly switched telephone connection is regarded as remote content. In some instances, local content may have been previously obtained from a remote source as remote content and subsequently made available as local content. The described home network may operate within and/or be compatible with networks specified under the Digital Living Network Alliance (DLNA).

Figure 4:
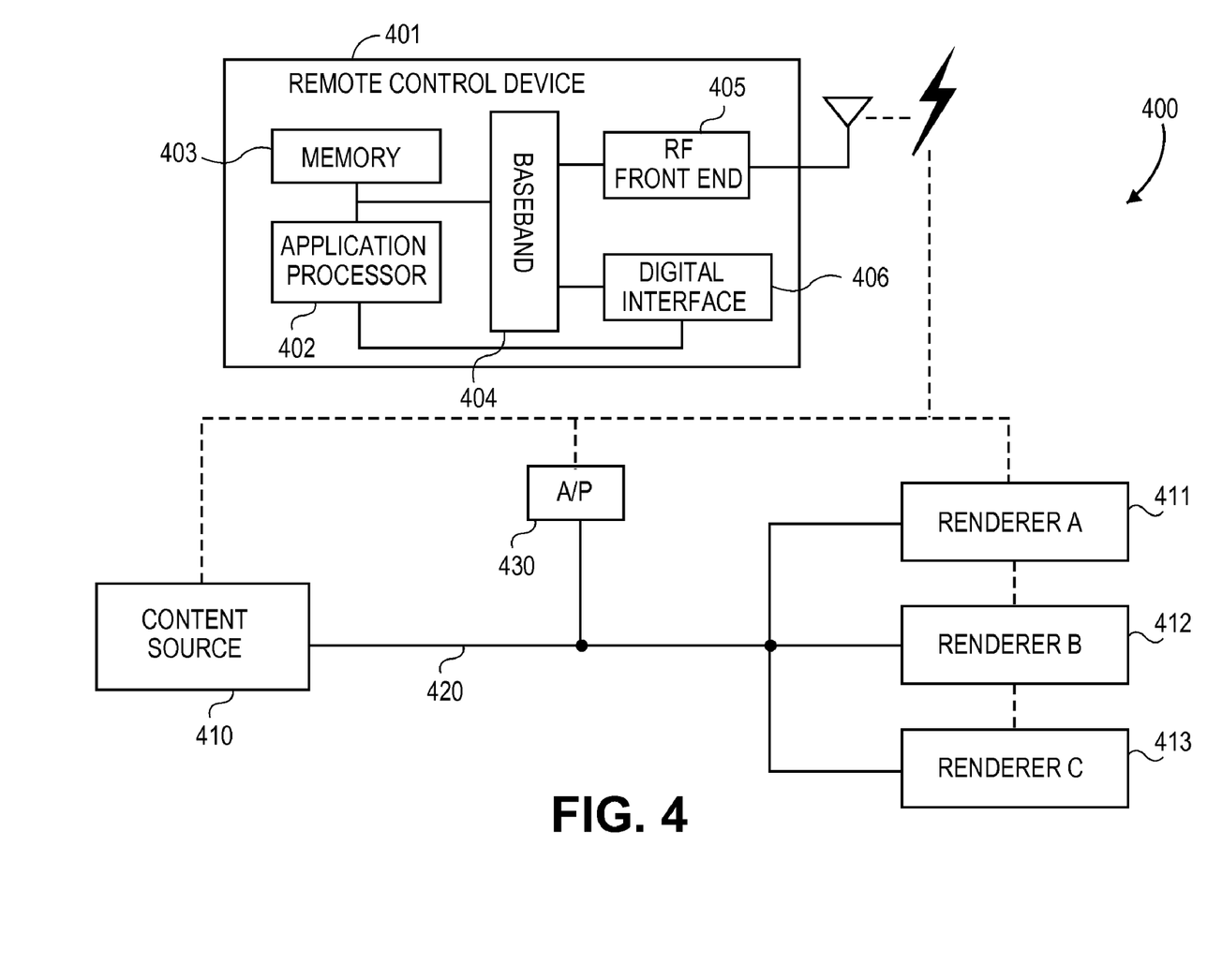
FIG. 4 is a block diagram showing a remote unit that is used to control transfer of content from a source and to select a rendering device from a plurality of rendering devices to deliver the content.

FIG. 4 illustrates how the various devices that communicate through home network 301 function within premise 302 in rendering a selected content. The example is applicable to the home network(s) of FIGS. 1 and 2 as well. In FIG. 4, a particular selected content is sourced from a content source 410 and communicated onto home network 420 to be rendered by one or more of the rendering devices 411-413. The content may be selected by various means, but generally, the content is identified by a user for rendering. For example, the content may be a photograph stored in a camera, in which the photograph may be rendered on a video display for viewing or sent to a printer for printing. In another example, the sourced content may be a movie on a DVD disc that is to be rendered on a television set or on a computer display monitor. The sourced content may be local content or remote content.

In example system 400 of FIG. 4, remote control device 401 (hereinafter simply referred to as a "remote") controls selection of the content from a particular source (in this instance, source 410). For example, a user may select to watch a movie from a DVD disk loaded into DVD player (such as device 316). In another example, a user may choose a photograph stored in camera 310 for printing. In some instances, there may be automated selection for choosing a particular content. For any of a variety of reasons, a content is selected for rendering by one of the rendering devices. The content is sourced onto home network 420 to deliver the content for rendering.

Home network 420 may be a single network or a plurality of networks and home network(s) described in reference to FIGS. 1 and 2 may be readily implemented for home network 420. A variety of control devices, including those control devices of FIGS. 1 and 2, may be used as remote 401. Remote 401 may be coupled to home network 420 by wired means, but for purposes of mobility, remote 401 is typically wirelessly coupled to home network 420. In one embodiment remote 401 couples to home network 420 through an access point (A/P) 430. In another embodiment, remote 401 couples wirelessly to devices coupled onto home network 420, such as content source 410. What is to be noted is that remote 401 may couple to content source 410 directly or may couple to content source 410 through home network 420, via some means, such as A/P 430 or another device coupled to home network 430. Likewise, remote 401 may couple to one or more renderers 411-413 directly or may couple to one or more renderers through home network 420, via some means, such as A/P 430 or another device coupled to home network 430. By having remote 401 coupled to content source 420, either directly or indirectly via home network 420, remote 401 may select a particular content to be rendered from content source 420.

As noted above, the content may be selected by a variety of means. However, in the particular example, remote 401 is used to select the content. A variety of remote control devices and/or circuitry may be implemented for remote 401. In one embodiment, remote 401 includes an application processor 402, baseband processor (which may be a digital signal processor, DSP) 404, and RF front end 405. A digital interface 406 may be included for wired connection to network 420 or to devices coupled to network 420. A memory 403 may be included as well for storing of program instructions and/or data. Generally, baseband processor 404 provides baseband operations at the digital level and RF front end 405 provides RF (radio frequency) conversion for transmitting and receiving RF signals. Baseband and RF front end operations in wireless devices are generally understood.

In one embodiment, remote 401 performs operations described below by use of applications processor 402. Software that has program instructions to perform these described actions reside within control device 401, such as in memory 403, to operate with application processor 402. The software may have been pre-loaded into remote 401 or may have been resident on a machine readable medium at one point and loaded into remote 401. Application processor 402 then executes program instructions of the software. In other embodiments, some or all of the software functions could be performed in hardware or firmware. What is to be noted is that whatever the structure of remote 401, remote 401 has processing capability to access network 420 or content source 410 to source a given content of source 410. In some embodiments, remote 401 may be preloaded or through programmed inquiry, determined the presence of network 420 and source 410.

Similarly, remote 401 is also aware of a plurality of rendering devices coupled to home network 420. In the particular example, three rendering devices 411, 412, 413 are coupled to home network 420. Rendering devices 411-413 are noted as renderer A, B and C, respectively. The actual number of renderers coupled to home network 420 may vary and the three here are shown as an example only. Other systems may have less or more rendering devices coupled to home network 420. Remote 401 may be wired or wirelessly coupled to any or all of the renderers 411-413 directly (as shown by the dotted line) or indirectly via home network 420. What is to note is that remote 401 is aware of the presence of rendering devices 411-413 coupled to home network 420. Thus, whether by having preloaded configuration information or inquiring about the network configuration during operation (such as at start up), remote 401 is aware of the presence of home network 420, content source 410, rendering devices 411-413, as well as any other devices coupled to home network 420. The configuration information may be stored within memory 403 of remote 401 and subsequently operated upon by application processor 402.

As part of the configuration information, remote 401 obtains information about the content that is being sourced. A variety of techniques may be used by remote 401 to identify the content. Since much of the content that are used within a home environment includes meta-data to identify the content, in one embodiment remote 401 may access the meta-data associated with the content to characterize the content. For example, movies in digital format have meta-data that identifies the title of the movie, as well as other features associated with the movie. Similarly, audio content, such as songs and music, also have meta-data identifying the title and the artist. For home generated content, such as home videos or photographs, there is meta-data associated with each content. For example, a photograph in JPEG (Joint Photographic Experts Group) format may have an associated title (even if just a frame number) that operates as the meta-data to identify the particular content or may include meta-data as part of the EXIF (Exchangeable Image File) tag. Whatever means is utilized, remote 401 identifies the nature of the content when directing the content to be placed onto home network 420. In some embodiments, remote 401 may also perform a search through multiple content sources to locate the desired content for selection.

Once the content is selected from a source for rendering and the content characterized as to the nature or property of the content, then a rendering device is selected by remote 401. If there is only one renderer to render the content, then the selection process is done. However, in a typical situation where multiple rendering devices have the ability to render the content, then device 401 performs operations to select one or more renderers for rendering the content. In the example of FIG. 4, the shown rendering devices 411-413 are assumed to be capable of rendering the selected content from source 410. Remote 401 identifies a renderer that may render the content. The initial selection may be based on some selection process, such as user input. Remote 401 also identifies any other alternate renderer that may render the device. In an alternative approach, remote 401 may identify multiple devices that may render the content.

As an example, renderers A, B and C may all be video displays for displaying video. A user, using remote 401, selects a content from content source 410. The movie may be locally stored or loaded as local content or, alternatively, the movie may be obtained from a remote content source reached through an external communication channel as noted earlier in the disclosure. Once the content is identified and its associated properties are characterized, remote 401 then selects one or more of renderers A, B, C. Assuming that home network 420 in this example is a single network, a singular pathway is available from content source 410 to each renderer A-C.

In identifying the possible renderers to render the content, remote 401 characterizes operating properties of each renderer A-C. One or more parameters may be characterized for each renderer. One parameter may be to identify the resolution of each of the displays. For example, renderer A may be a standard definition television set located in one room of the home, renderer B may be another standard definition television set in a different room and renderer C may be a high definition (HD) television (such as a 1080p TV). Depending on the resolution of the movie content in this example, a particular optimum rendering device may be selected to view the movie. That is, if the movie has 1080p resolution, it may be optimally viewed at 1080p on renderer C. However, if the movie is of lower resolution, then renderer A or B may be the more optimal rendering device based on another parameter, such as proximity to remote 401 to each of the rendering devices, since the location of remote 401 is usually the location of the user who wants to view the movie.

The example above pertained to a digital video content that is selected for rendering. However, the content may be of other data or multimedia format, including audio, still images (photos), moving images, etc. In the example above, renderers A-C may be further identified by additional parameters. For example, renderer A may have audio surround sound capability, while renderer B has ordinary 2-channel stereo. Thus, the optimum rendering device may be renderer A, if the movie is capable of having its audio perform in a surround sound environment.

As another example, if renderers A-C are different printers, then renderer A may be a black and white laser printer, renderer B may be a color printer and renderer C may be a high-resolution, but slower speed, photo printer. Once the content and the possible renderers are identified by remote 401, the selection criteria may follow the following scenario. If the content is a text document, the desired printer to be selected by remote 401 may be the black and white printer. If the content is an illustration, such as a color chart, then the color printer may be the desired selection and if the content is a photograph, then the high-resolution color printer may be the desired printer. The various scenarios are endless and the above are just some examples.

As noted above, once the content is identified and characterized for its properties, remote 401 then locates one or more renderers that may perform the rendering function. Remote 401 characterizes the operating parameters of the rendering devices and selects a renderer based on a particular criteria. The particular criteria for selecting a renderer may be predetermined and that information stored in remote. For example, one predetermined criterion may be to select the most optimum display based on resolution for displaying moving video, when the content is moving video. As another, the criterion may be to select the nearest display proximal to remote 401 based on the assumption that the user wants the content rendered at his/her present location. Other examples may be set for the predetermined criteria.

In another embodiment for practicing the invention, remote 401 may order and rank each renderer that may render the content. With the TV resolution example above, remote 401 may rank renderers A-C based on each's ability to render the content. With proximity, the ranking may be based on the nearness of each renderer to the remote. Remote 401 may then select the highest ranking renderer as an optimum renderer for the content or, alternatively, provide the listing or ranking to the user to allow the user to make the selection choice.

Furthermore, it is to be noted that more than one parameter may be viewed for each renderer. In the example above, the displays may be characterized based on both the resolution, as well as the ability to reproduce the audio. Both may be taken into account in making the selection. One advantage of making the various parameters available to the user is that the user is given the choice of which renderer to render the content from a list of rendering devices that have the ability to render the chosen content.

Figure 5:
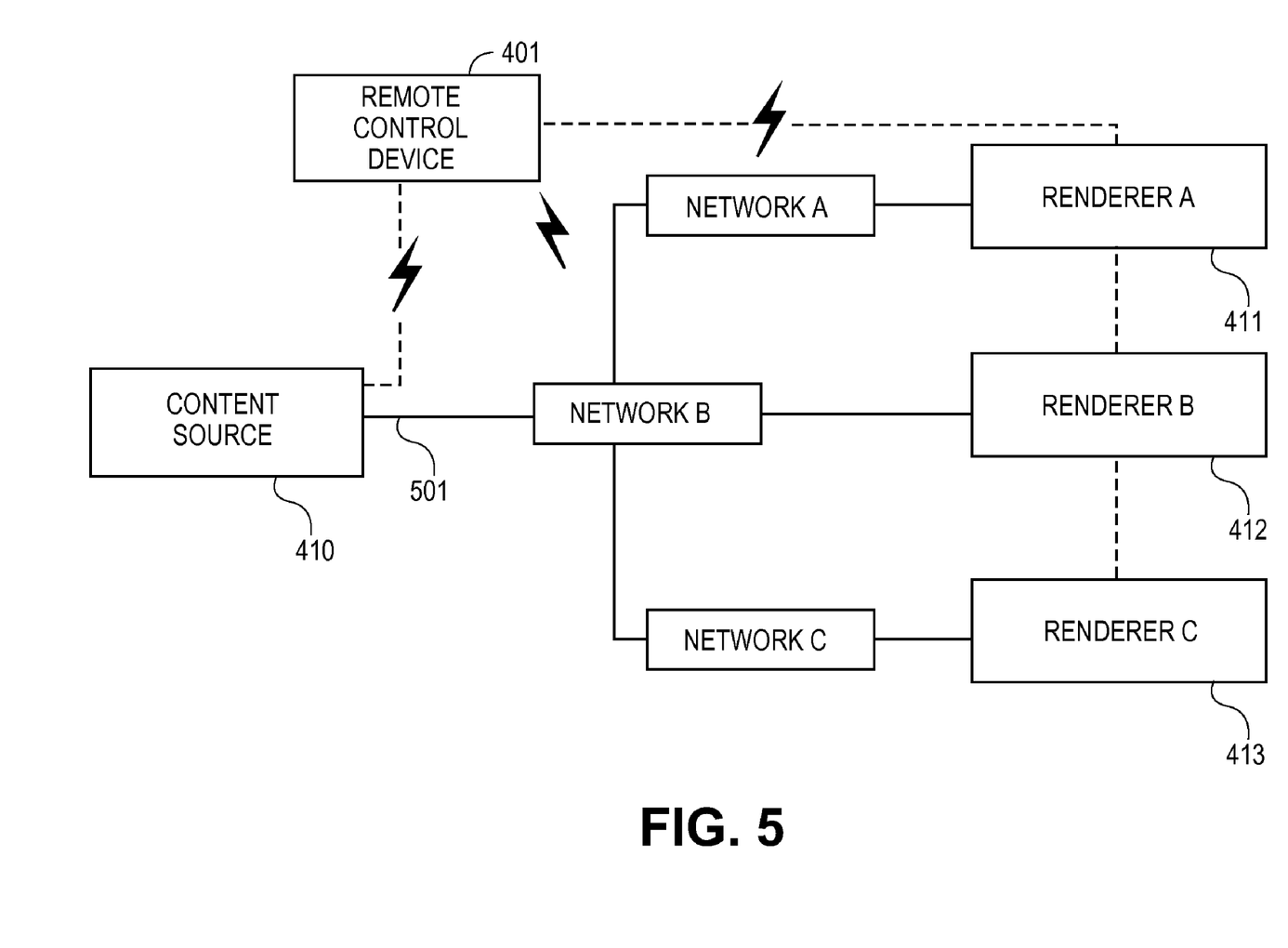
FIG. 5 is a block diagram showing a remote unit that is used to control transfer of content from a source and to select a rendering device from a plurality of rendering devices and a pathway among a plurality of networks to deliver the content.

FIG. 5 shows an alternative embodiment for practicing the invention in which multiple networks are present for transferring the content from content source 410 to renderers A-C under control of remote 401. In the example of FIG. 5, multiple networks are present. Content source 410 is coupled to network B, as is renderer B. Network A and network C are coupled to network B and all three are inter-operable with each other in transferring content across the networks. Renderer A is coupled to network A and renderer C is coupled to network C. The various types of networks that may be used in a home network are described in reference to FIGS. 1 and 2.

In this arrangement, remote 401 may be coupled to one or more networks and/or network controllers, as well to content source 410 and rendering devices 411-413 by wired or wireless communication means. As noted with the example of FIG. 4, remote 401 may couple to content source 410 directly or indirectly through one or more of the networks. As an example, a direct wireless connection is shown (dotted line) between remote 401 and content source 410. However, an indirect connection via one or more of the networks may be used as well to couple to content source 410. Wired connections may be used as well.

Likewise remote 401 may couple to one or more renderers 411-413 through wired or wireless means, either directly or indirectly via one or more networks. As one example, a direct wireless connection is shown (dotted line) between remote 401 and renderers 411-413. Furthermore, where multiple networks are present, as in this instance, remote 401 may characterize one, some or all of the networks as well to ensure that a pathway to be taken from content source 410 to a particular renderer may be selected based on the characterization. As noted above with the content source and the renderers, remote 401 may be preloaded with information about one or more networks or the information may be obtained by the remote, such as at start-up. Thus, remote 401 has information, or alternatively acquires information, that characterizes one or more sources, one or more renderers and/or one or more networks.

Figure 6:
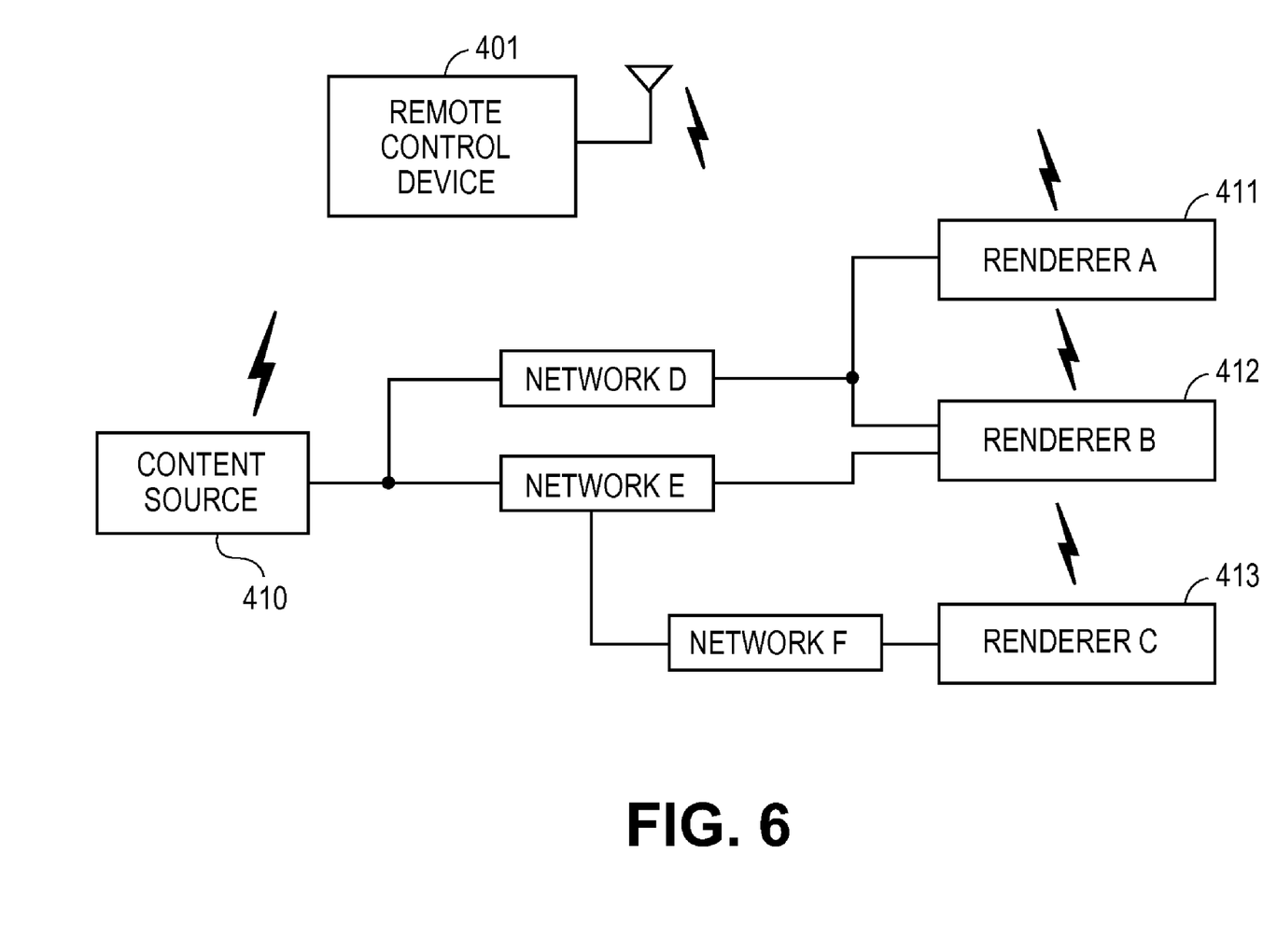
FIG. 6 is a block diagram showing a remote unit that is used to control transfer of content from a source and to select a rendering device from a plurality of rendering devices and an optimum pathway from a plurality of networks to deliver the content.

FIG. 6 is another alternative embodiment for practicing the invention with multiple networks. In this instance content source 410 is coupled to network D and network E. Renderer A is coupled to network D and renderer B is coupled to both networks D and E. A third network F is coupled to network E and renderer C is coupled to network F. Again, all three networks are inter-operable for transferring the content to the renderers. In this example, renderer B has two pathways for the content to be delivered. The content may use network D or network E. As an example, network D maybe a wired connection (such as cable), while network E maybe a wireless connection (such as Wi-Fi) to transfer the content to renderer B.

In a situation when multiple pathways are present for the content to reach a particular renderer, remote 401 identifies and characterizes the networks as described above, but also determines the possible multiple pathways between devices. When using the above described criteria for determining a chosen renderer to render the content, remote 401 takes into account the various available pathways. For example, a network criteria may be speed and latency, so that these properties are considered when choosing a path to the renderer. Furthermore, the pathway may be dependent on the property of the content. For example, a particular network that is coupled to a renderer may not be able to support a high data rate required for transferring a particular content. In that instance, characterizing the content and the network would alert remote 401 that the content transfer through that network may not be desirable or achievable. Accordingly, selection of an optimum pathway or at least one selected pathway to a renderer is now considered as well in determining the desired or optimum renderer for rendering the content.

Figure 7:
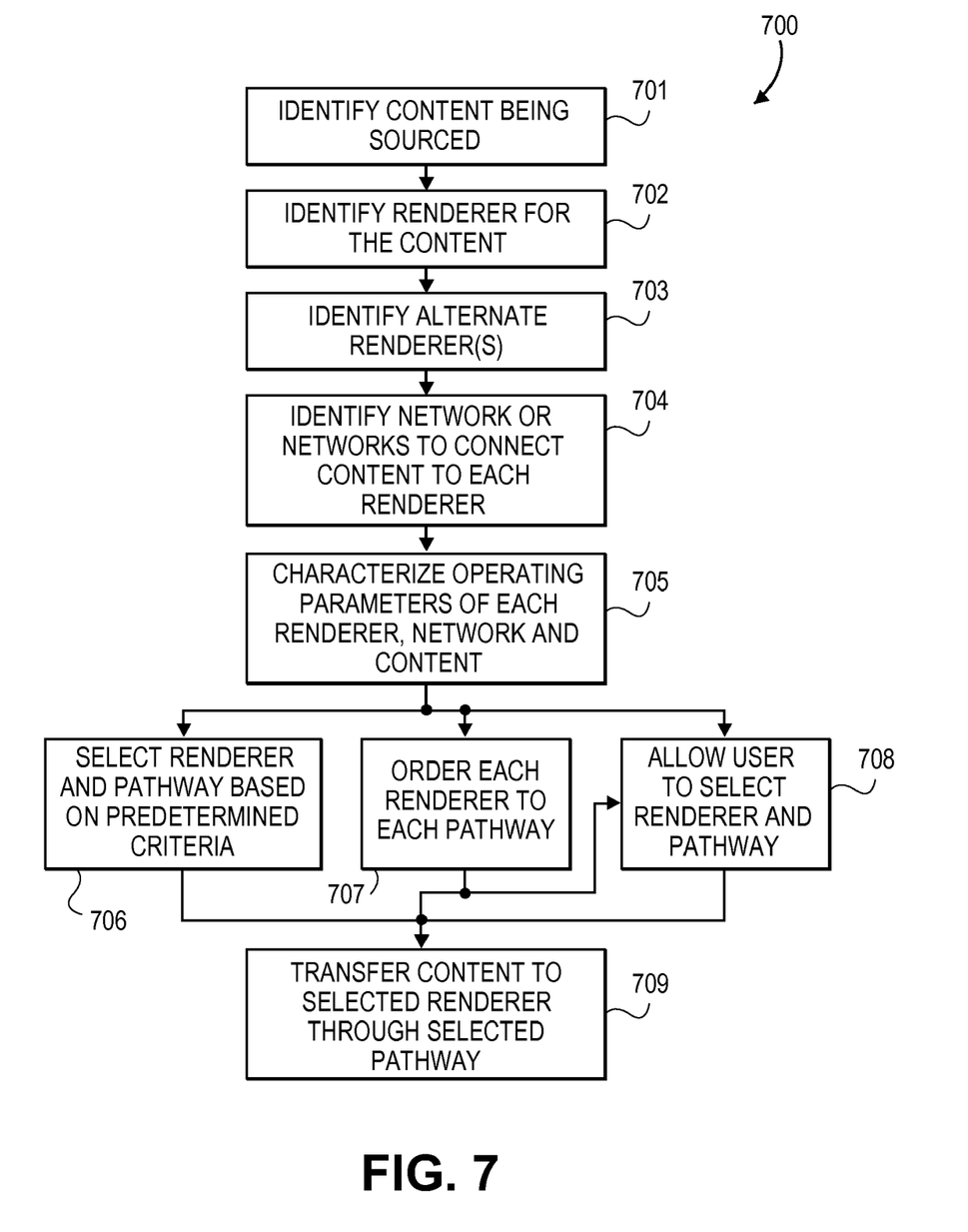
FIG. 7 is flow diagram illustrating one technique of implementing content delivery to a selected rendering device according to one embodiment for practicing the invention.

FIG. 7 illustrates a process 700, which may be executed by the above-described software resident in remote 401 to identify and characterize the content, the various renderers for rendering the content, and the networks that are available for content transfer. First, remote 401 identifies the content that is to be transferred (block 701). Then, a renderer is identified that may render the content (block 702). Other renderers that may also render the content are identified (block 703). Next, one or more networks that are available for establishing a pathway to transfer the content to each renderer are identified (block 704). Next, operating parameters of each renderer are characterized, along with the content (block 705). The network(s) may also be characterized as well.

Once the operating parameters of the renderers are processed with the content and network characterizations, a renderer may be selected. Where there are established or predetermined criteria, the software may select the desired or optimum renderer and the pathway to take to the renderer (block 706). The remote may also order or rank the various renderers or the various renderers with identified pathways and select one combination for transferring the content (block 707). Still, remote 401 may also allow the user to choose one of the various combinations available, whether ranked or not ranked (block 708). Once a renderer and pathway are identified, the content may be transferred (block 709). It is to be noted that in some instances, the content may be transferred to more than one renderer. Remote 401 may also make that selection for transferring the content to multiple renderers.

Figure 8:
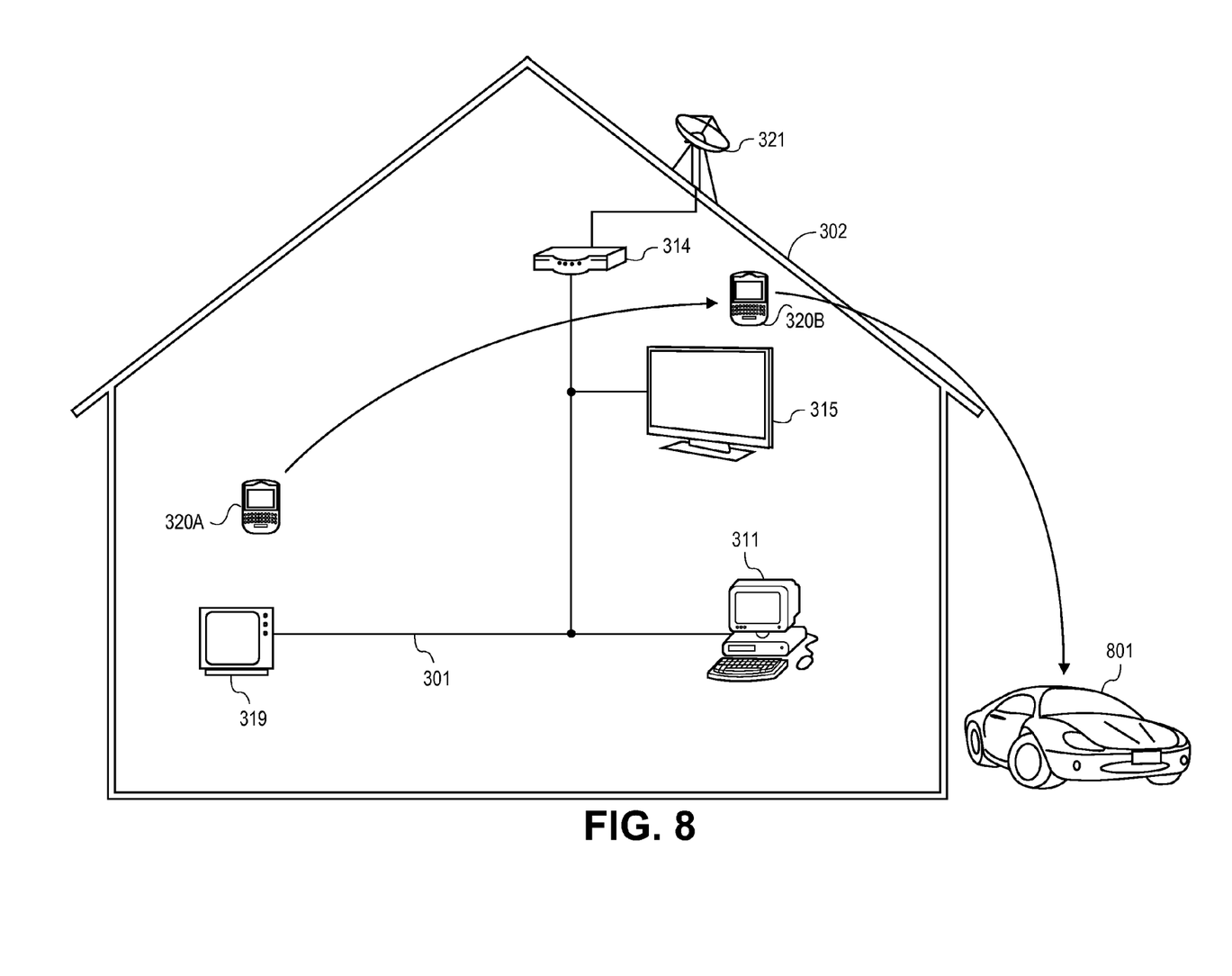
FIG. 8 is an example pictorial diagram showing a sourcing of content for rendering on a selected one of video display devices located throughout a home and the transfer of the content to other rendering devices.

FIG. 8 illustrates another example in which content is transferred to a renderer where a remote selects the renderer and a pathway for transferring the content. In the particular example of FIG. 8, a remote video content (such as a movie or a television program) is received by modem (or set-top box) 314 via antenna 321. It is to be noted that modem 314 may be coupled to a provider of the content by cable. However connected, the content is received by modem 314 and placed on home network 301. As an alternate scenario, local content may be provided within the home, such as by a recorded content or loaded content. That is, recorded shows on a DVR or a movie on a DVD disc may provide the local content.

Three devices are shown as possible displays for rendering the video content noted above. The three rendering devices are television 315, television 319 and PC 311. All three are coupled to home network 301 and are shown residing at different locations in the home. As noted above, home network 301 may have one network only or may be comprised of multiple networks. Remote control device 320 in this instance operates equivalent to remote 401 described above. Remote 320 is shown at a first location as remote 320A and at a second location as remote 320B. In this example, remote 320A is at the first location when the content is selected for display. The processing in the remote then follows the routine described in reference to FIG. 7 to identify the plurality of renderers for rendering the content (e.g. displaying the content in this example) and determining which pathway to take when multiple pathways are present to one or more renderers.

For example, PC 319 may be selected as the desired renderer if the overriding criteria is proximity of viewing. However, based on another criterion, such as resolution, the remote may identify television set 311 or 315 as a higher resolution display than PC 319. In that event, the content may be transferred to television set 315 or set 311. The user may be given a choice of the three renderers for displaying the content. As noted above, the choices may be ordered or ranked. The user then may input the selection into the remote.

If the criterion for selecting the renderer is based on proximity to the remote, PC 319 may be selected, because it is the closest renderer among the three. In one embodiment, remote 320 is monitored for its location within the home. This may be done by a local position determining system within remote 320 or within the premise, or done by a much broader system such as GPS (global positioning system), so that remote 320 is able to ascertain its location with the home. When remote 320 has location determining capability, a change in location may also cause a change in the delivery of the content. For example, if device 320A changes position to 320B, the remote may also cause the content to now be delivered to the new nearest renderer, which is set 315, and terminate the content delivery to PC 319. The transfer may be automatic or done only after an affirmation for transfer has been given by the user. By this technique, a movie or other content may follow the user throughout the home.

As a further example, if the user now decides to leave the premise, such as by driving away from the premise in vehicle 801, and the user takes remote 320 along, the content may be again transferred to a renderer that is in the vehicle and capable of rendering the content. For example, if the content was audio (such as music), the user can continue to listen to the audio while traveling in his vehicle.

Thus, by having means to identify various rendering devices that may render the content, a remote may process the parameters of each available rendering device and characterize a desired or optimum renderer for rendering the content. Where multiple networks are present, the remote may characterize the networks as well to determine a desired or optimum pathway to deliver the content. In some embodiments, the remote may also possess processing capability to control the renderers themselves, in order to set up certain rendering parameters based on the content that is about to be rendered. This ability to initiate the setting of renderers by the remote may be taken into account when selecting the desired or optimum renderer Accordingly, rendering device selection in a home network is described.

As may be used herein, the terms "substantially" and "approximately" provides an industry-accepted tolerance for its corresponding term and/or relativity between items. Such an industry-accepted tolerance ranges from less than one percent to fifty percent. Such relativity between items ranges from a difference of a few percent to magnitude differences. As may also be used herein, the term(s) "coupled" and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items.

Furthermore, as used herein, a processing device (or processor) may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions and such processing device may have accompanying memory.

The embodiments of the present invention have been described above with the aid of functional building blocks illustrating the performance of certain functions. The boundaries of these functional building blocks have been arbitrarily defined for convenience of description. Alternate boundaries could be defined as long as the certain functions are appropriately performed. One of ordinary skill in the art may also recognize that the functional building blocks, and other illustrative blocks, modules and components herein, may be implemented as illustrated or by discrete components, application specific integrated circuits, processors executing appropriate software and the like or any combination thereof.

We claim:

1. A method comprising:
    using a remote device to identify a source of a transaction for transferring content on a home network;
    using the remote device to identify a plurality of renderers for rendering the content when transferred;
    using the remote device to identify one or more pathways within the home network from the source to the plurality of renderers;
    determining a rendering parameter associated with the content, wherein the rendering parameter identifies at least one of video resolution, audio presentation or print presentation for rendering the content;
    determining an operating parameter for each of the plurality of renderers to render the content based on the rendering parameter, wherein a respective operating parameter for each renderer identifies that renderer's ability to render the content based on the rendering parameter;
    ranking the plurality of renders for rendering the content based on the rendering parameter associated with the content, operating parameter for each of the plurality of renders and available pathway or pathways from the source to each renderer; and
    selecting an optimal combination of a particular renderer from the plurality of renderers and a pathway from the source to the selected particular renderer to render the content based on the ranking.

2. The method of claim 1, wherein selecting the particular renderer to render the content includes automatically selecting the particular renderer from the ranking.

3. The method of claim 1, wherein selecting the particular renderer to render the content includes allowing a user to select the particular renderer from the ranking.

4. The method of claim 1, further including using the remote device to alter a rendering property of the particular renderer to render the content.

5. The method of claim 1, further including transferring rendering of the content from the particular renderer to a second renderer when a user's proximity changes from the particular renderer to the second renderer.

6. The method of claim 1, further including terminating rendering of the content at the particular renderer when a user is no longer within proximity to the particular renderer.

7. The method of claim 1, further including rendering of both sound and video, in which sound and video are rendered separately in respective sound and video renderers.

8. The method of claim 1, in which the remote device is a mobile phone.

9. An apparatus comprising:
    a radio frequency (RF) front end to communicate with a source and a plurality of renderers, in which content is sent from the source to the renderers through one or more pathways of a home network;
    a baseband processor coupled to the RF front end for conversion of signals for transmission and reception from the RF front end; and
    an application processor coupled to the baseband processor to execute a program set of instructions and to generate signals to the renderers in response to the program set of instructions, in which the application processor is to execute the program set of instructions to identify and characterize the source, the content, the plurality of renderers and one or more pathways from the source to each respective renderer, determine a rendering parameter associated with the content, wherein the rendering parameter identifies at least one of video resolution, audio presentation or print presentation for rendering the content, determine an operating parameter for each of the plurality of renderers to render the content based on the rendering parameter, wherein a respective operating parameter for each renderer identifies that renderer's ability to render the content based on the rendering parameter, rank the plurality of renders for rendering the content based on the rendering parameter associated with the content, operating parameter for each of the plurality of renders and available pathway or pathways from the source to each renderer, and select an optimal combination of a particular renderer from the plurality of renderers and a pathway from the source to the selected particular to render the content based on the ranking.

10. The apparatus of claim 9, wherein the application processor allows a user to select the particular renderer from the ranking.

11. The apparatus of claim 9, wherein the apparatus is a mobile telephone.

12. A non-transitory machine-readable medium embodying a program of instructions thereon for execution by a machine, in which when the program is executed by the machine performs a process comprising:
    identifying a source of a transaction for transferring content on a home network;
    identifying a plurality of renderers for rendering the content when transferred;
    identifying one or more pathways within the home network from the source to the plurality of renderers;
    determining a rendering parameter associated with the content, wherein the rendering parameter identifies at least one of video resolution, audio presentation or print presentation for rendering the content;

determining an operating parameter for each of the plurality of renderers to render the content based on the rendering parameter, wherein a respective operating parameter for each renderer identifies that renderer's ability to render the content based on the rendering parameter;

ranking the plurality of renders for rendering the content based on the rendering parameter associated with the content, operating parameter for each of the plurality of renders and available pathway or pathways from the source to each renderer; and selecting an optimal combination of a particular renderer from the plurality of renderers and a pathway from the source to the selected particular renderer to render the content based on the ranking.

13. The non-transitory machine-readable medium of claim 12, wherein when the executed process determines the ranking, the process allows a user to select the particular renderer from the ranking.

14. The method of claim 1, wherein when using the remote device, the remote device communicates with the source, plurality of renderers and one or more pathways through an access point coupled to one of the pathways.

15. The method of claim 1, wherein when selecting the optimal combination of the particular renderer from the plurality of renderers and the pathway from the source to the selected particular renderer to render the content, the pathway is selected based on speed and latency in delivering the content.

16. The method of claim 1, wherein when selecting the optimal combination of the particular renderer from the plurality of renderers and the pathway from the source to the selected particular renderer to render the content, the pathway is selected based on property of the content.

17. The apparatus of claim 9, wherein the RF front end to communicate with the source, plurality of renderers and one or more pathways through an access point coupled to one of the pathways.

18. The apparatus of claim 9, wherein when the application processor selects the optimal combination of the particular renderer from the plurality of renderers and the pathway from the source to the selected particular renderer to render the content, the pathway is selected based on speed and latency in delivering the content.

19. The apparatus of claim 9, wherein when the application processor selects the optimal combination of the particular renderer from the plurality of renderers and the pathway from the source to the selected particular renderer to render the content, the pathway is selected based on property of the content.

20. The non-transitory machine-readable medium of claim 12, wherein when the executed process selects the optimal combination of the particular renderer from the plurality of renderers and the pathway from the source to the selected particular renderer to render the content, the pathway is selected based on speed and latency in delivering the content.

* * * * *

UNITED STATES PATENT AND TRADEMARK OFFICE
CERTIFICATE OF CORRECTION

PATENT NO.       : 8,321,564 B2
APPLICATION NO.  : 12/343634
DATED            : November 27, 2012
INVENTOR(S)      : Stephen Ray Palm It is certified that error appears in the above-identified patent and that said Letters Patent is hereby corrected as shown below:

In the Claims

Col. 14, Line 47, in claim 9: after "selected particular" insert --renderer--

Signed and Sealed this
First Day of October, 2013

Teresa Stanek Rea
*Deputy Director of the United States Patent and Trademark Office*